United States Patent
Bayon et al.

(10) Patent No.: US 11,449,627 B2
(45) Date of Patent: Sep. 20, 2022

(54) TOKENIZATION IN A CLOUD BASED ENVIRONMENT

(71) Applicant: Amadeus S.A.S., Biot (FR)

(72) Inventors: Roman Jean Jo Bayon, Antibes (FR); Giuseppe Andrea Turelli, Chiari (IT)

(73) Assignee: Amadeus S.A.S., Biot (FR)

( * ) Notice: Subject to any disclaimer, the term of this patent is extended or adjusted under 35 U.S.C. 154(b) by 252 days.

(21) Appl. No.: 16/856,711

(22) Filed: Apr. 23, 2020

(65) Prior Publication Data
US 2020/0387623 A1 Dec. 10, 2020

(30) Foreign Application Priority Data

Jun. 4, 2019 (FR) ...................................... 1905885

(51) Int. Cl.
*G06F 21/62* (2013.01)
*G06F 16/27* (2019.01)
*G06F 11/14* (2006.01)
*H04L 9/32* (2006.01)
*H04L 9/40* (2022.01)

(52) U.S. Cl.
CPC ...... *G06F 21/6227* (2013.01); *G06F 11/1464* (2013.01); *G06F 16/27* (2019.01); *G06F 21/6245* (2013.01); *H04L 9/3242* (2013.01); *H04L 63/08* (2013.01); *G06F 2201/80* (2013.01)

(58) Field of Classification Search
CPC ............. G06F 21/6227; G06F 21/6245; G06F 11/1464; G06F 16/27; G06F 2201/80; H04L 63/08; H04L 9/3242

USPC .......................................................... 713/164
See application file for complete search history.

(56) References Cited

U.S. PATENT DOCUMENTS

| 10,192,072 | B1  |   | 1/2019 | Galvin, Jr. et al. |
|---|---|---|---|---|
| 11,086,619 | B2 | * | 8/2021 | Sharma ............... G06F 11/3688 |
| 2016/0019396 | A1 |   | 1/2016 | Davis et al. |
| 2017/0004483 | A1 | * | 1/2017 | Runyan ................ G06Q 20/385 |
| 2018/0062832 | A1 |   | 3/2018 | Hatcher |

OTHER PUBLICATIONS

HPE Secure Stateless Tokenization (SST) Hewlett Packard Enterprise (Year: 2016).*
Designing a redundant backup solution https://www.techtarget.com/searchdatabackup/tip/Designing-a-redundant-backup-solution Brien Posey Dec. 12, 2012 (Year: 2012).*
National Institute of Industrial Property, Search Report issued in French Application No. FR1905885 dated Dec. 19, 2019, and English translation thereof.

* cited by examiner

*Primary Examiner* — Benjamin A Kaplan
(74) *Attorney, Agent, or Firm* — Thompson Hine LLP

(57) ABSTRACT

Systems and methods for tokenization in a cloud-based environment. The disclosed systems and methods may perform operations including receiving input to be tokenized; obtaining a keyed hash function from a key management system; using the keyed hash function to generate a storage token for the input; creating an encrypted database entry linking the generated token to the received input; setting an expiry for the storage token; and when the storage token is received before the expiry, providing the linked input in response.

19 Claims, 9 Drawing Sheets

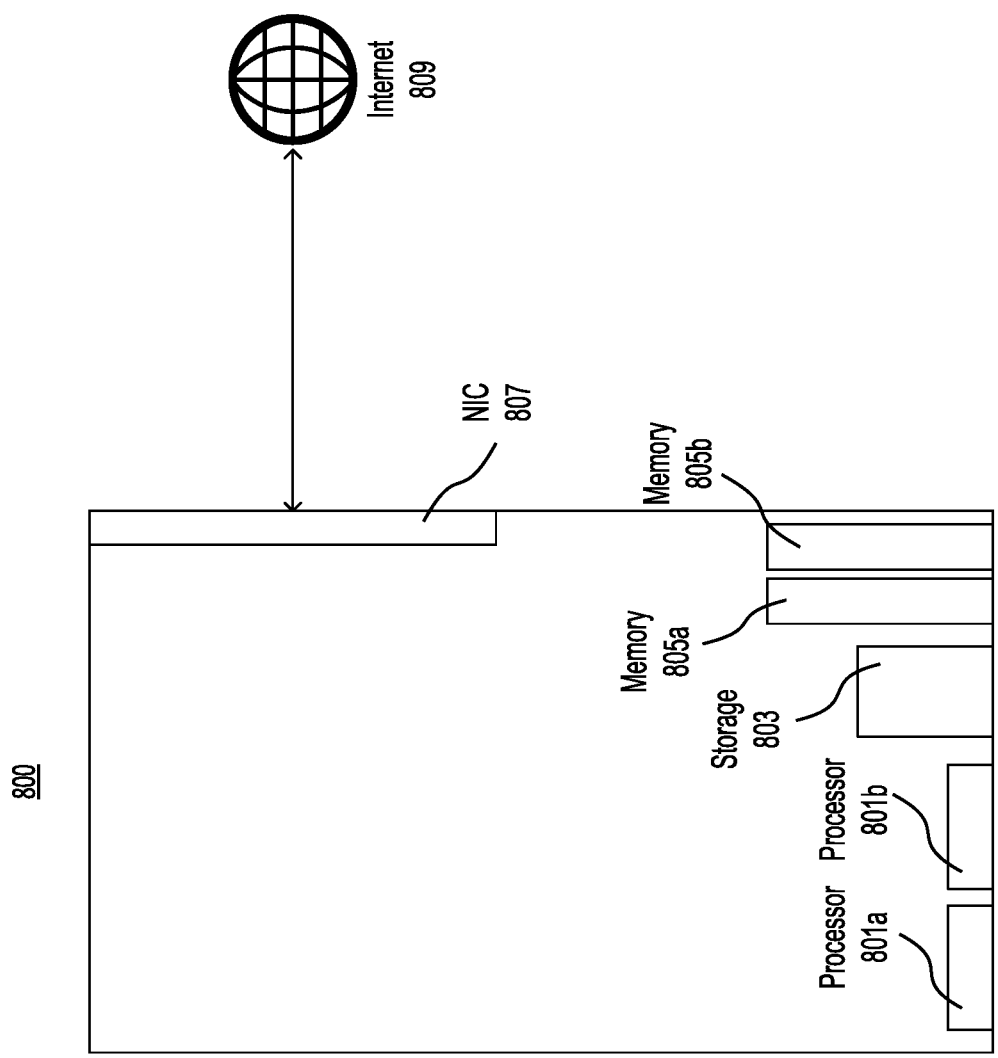

TOKENIZATION IN A CLOUD BASED ENVIRONMENT

TECHNICAL FIELD

The present disclosure relates generally to high-entropy tokenization techniques. In particular, this disclosure relates to deploying high-entropy tokenization in a cloud-based environment with low-entropy tokenization on a corresponding network.

BACKGROUND

Traditional tokenization techniques are not generally suitable for long-term storage. For example, encryption techniques that are low-entropy are not secure. Similarly, encryption techniques that are non-deterministic (such as those that use salting to increase entropy) may cause conflicts within the long-term storage. Moreover, secure encryption techniques are not generally reversible and therefore cannot be used for long-term storage and retrieval.

A need therefore exists for a system of encryption that can tokenize information for long-term storage, and can retrieve the tokenized information upon an authorized request. As disclosed herein, systems and methods for token encryption can provide a long-term storage encryption that overcomes the deficiencies of existing approaches.

SUMMARY

Embodiments of the present disclosure describe systems and methods for long-term storage of encrypted token. Moreover, this encryption may be combined with short-term network encryption to provide a secure end-to-end mechanism for information transfer, storage, and retrieval. In addition, the combination of long-term storage encryption and short-term network encryption may provide for backup mechanisms if any portion of the end-to-end pipeline suffers failure.

In some embodiments, a system for tokenizing information in a cloud environment may comprise at least one processor and at least one non-transitory memory containing instructions that, when executed by the at least one processor, cause the system to perform operations. The operations may comprise receiving input to be tokenized, obtaining a keyed hash function, using the keyed hash function at a storage tokenizer to generate a storage token for the input, creating an encrypted database entry linking the generated token to the received input, setting an expiry for the storage token, and when the storage token is received before the expiry, providing the linked input in response.

In some embodiments, the keyed hash function may be obtained from a key management system.

In some embodiments, the operations may further comprise receiving, at a different processor of the cloud environment, a second input to be tokenized obtaining, for the different processor, the keyed hash function from the key management system, and using the keyed hash function to generate, at the different processor, a second storage token for the input, wherein the second storage token generated by the different processor is the same as the storage token generated by the at least one processor.

In some embodiments, the at least one processor and the at least one non-transitory memory may be distributed in a cloud environment. In some embodiments, the operations may further comprise receiving an identification and storing the identification along with the storage token in an application database. In such embodiments, the operations may further comprise obtaining the storage token stored in the application database.

In some embodiments, the operations may further comprise synchronizing the encrypted database entry across one or more servers. In such embodiments, the operations may further comprise authenticating the one or more servers before synchronization.

In some embodiments, the database may comprise a key-value store, that may comprise a NoSQL database.

In some embodiments, the operations may further comprise, when the database fails, retrieving entries of the encrypted database from one or more other servers, and rebuilding the encrypted database using the retrieved entries. In such embodiments, the operations may further comprise authenticating the one or more other servers before retrieving entries.

In some embodiments, the system may comprise or be in communication with a network tokenizer. In such embodiments, the operations may further comprise, when the encrypted database is malfunctioning, distributing the keyed hash function to the network tokenizer and generating a token using the keyed hash function at the network tokenizer, and when the encrypted database is functioning, receive as the storage token, the token generated using the keyed hash function from the network tokenizer.

In some of such embodiments, the operations may further comprise authenticating the network tokenizer before distributing the keyed hash function.

In some embodiments, the input may comprise a network token generated by the network tokenizer. In such embodiments, the operations may further comprise, when the encrypted database is malfunctioning, storing the input in a cache, and when the encrypted database is functioning, decoding the network token and storing an entry linking the storage token to the decoded input. In such embodiments, the cache may comprise an encrypted storage.

In some embodiments, the network token may be generated by the network tokenizer from sensitive information. In such embodiments, a server may function as the network tokenizer.

In some embodiments, the network tokenizer may be in communication with the at least one processor, and the operations may further comprise receiving the storage token, obtaining the network token from the storage tokenizer, routing the network token to the network tokenizer, and obtaining the sensitive information from the network token.

In some embodiments, the network may generate the network token using reversible tokenization. In such embodiments, the reversible tokenization may comprise format-preserving encryption.

In some embodiments, the operations may further comprise obtaining a key corresponding to a key used by the network tokenizer to generate the network token, using the corresponding key to decode the network token, and then generating a storage token using the keyed hash function. In such embodiments, the operations may further comprise periodically renewing the corresponding key.

In some embodiments, the network tokenizer may salt the sensitive information prior to generating the network token, and the operations may further comprise obtaining the salt used by the network tokenizer, and removing the salt from the decoded network token before generating the storage token using the keyed hash function.

In some embodiments, the system may be in communication with at least one network router. In such embodiments, the at least one network router may execute instructions to function as the network tokenizer.

Some embodiments combine network tokenization at the edge of the protected datacenters with storage tokenization for data to be stored by application within the datacenter. The network tokenizer may preserve the interface of application and may be low-entropy while the storage tokenizer may be high-entropy. In the network tokenizer, any increased risk from the low-entropy may be countered by the short lifetime of the network token.

Both network and storage tokenizers may replicate their token sets across multiple datacenters such that consistency across datacenters may be guaranteed. Moreover, the storage tokenizer may use a keyed hash function from a key management system to ensure consistency across different storage tokenizers.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The accompanying drawings, which are incorporated in and constitute a part of this specification, illustrate various embodiments of the present invention and, together with the general description of the invention given above, and the detailed description of the embodiments given below, serve to explain the embodiments of the invention. In the drawings, like reference numerals are used to indicate like parts in the various views.

FIG. 8 is a block diagram of an example device with which the systems, methods, and apparatuses of the present invention may be implemented.

DETAILED DESCRIPTION

Figure 1:
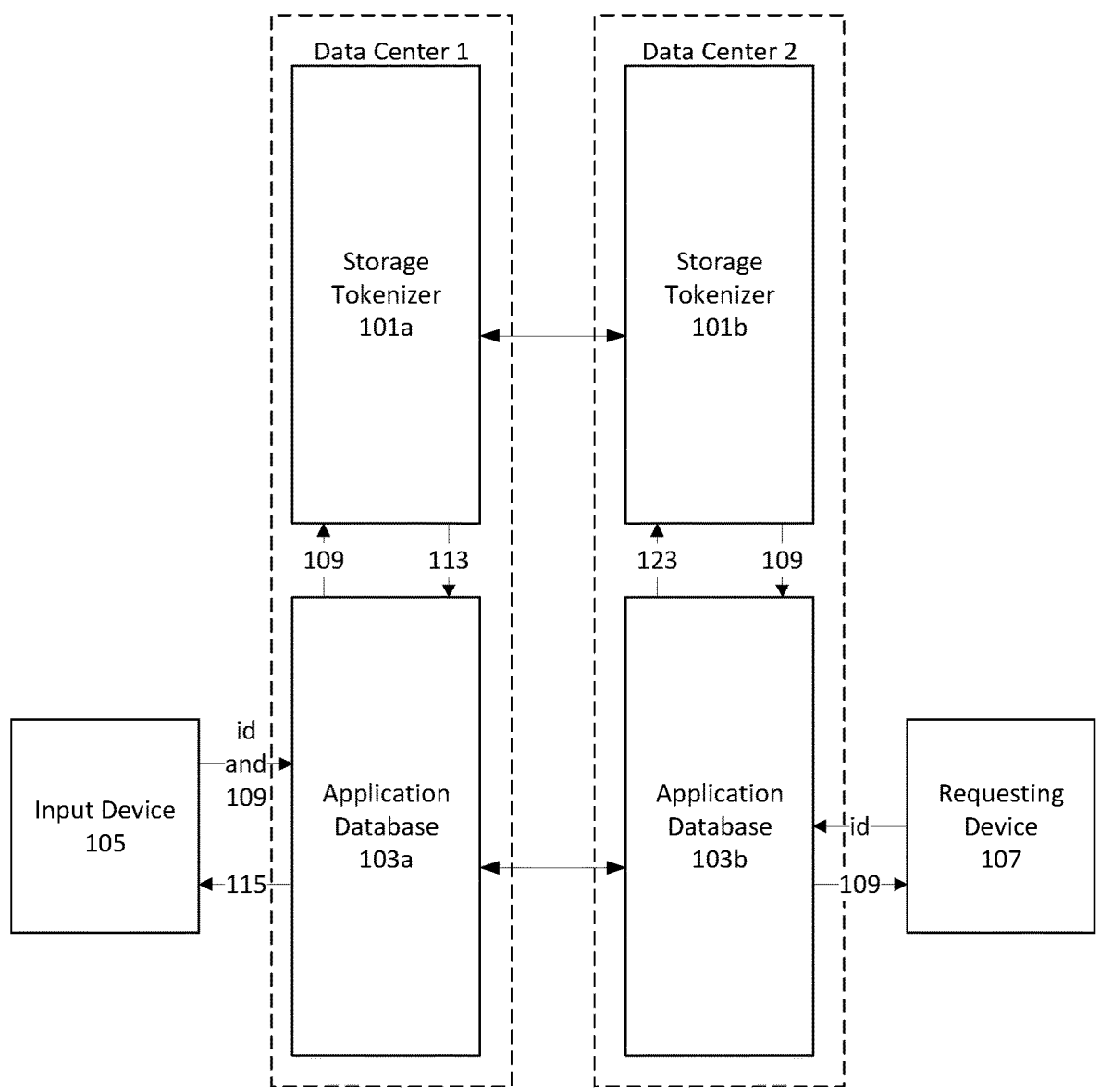
FIG. 1 depicts a system for long-term token encryption across a plurality of data centers in a cloud environment.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

An application may provide services to users and to processors. For example, an application may provide a portal for users to input information for a hotel reservation (in which example the hotel company is the processor). In another example, an application may provide a portal for users to input information for a purchase transaction (in which example the merchant and/or a credit card processor is the processor). Any such application may store the information from the user for later retrieval.

However, such information may be subject to various security regulations (e.g., being personally identification information (PII) or other information subject to General Data Protection Regulation 2016/679 (FDPR) or other regulations). Traditional encryption techniques to protect this stored information generally suffer from low-entropy or from lack of reversibility. However, low-entropy encryption subjects the information to a possibility of hacking while lack of reversibility renders the information not suitable for retrieval and re-use.

The envisioned systems and methods can provide long-term tokenization of information that is both high-entropy and reversible. Moreover, embodiments of the present disclosure may also be deterministic to avoid conflict and eventually consistent to resolve any conflicts. For example, the envisioned systems and methods can encrypt information for storage using a keyed hash function. The keyed hash function may be obtained from a key management system (KMS) in order to synchronize different data centers across a same cloud environment. In some aspects, the envisioned systems and methods can also provide short-term encryption via one or more network tokenizers. For example, the network tokenizers may use format-preserving tokenization prior to providing the generated token to the data center(s) for long-term storage encryption. The data center(s) may synchronize with the network tokenizers to employ the same key for short-term encryption. In some embodiments, the network tokenizers may also use salting, and the data center(s) may synchronize with the network tokenizers to employ the same salt. This modification can increase the entropy of the short-term encryption.

The envisioned systems and methods improve upon existing tokenization systems. For example, the envisioned systems and methods can provide reversible tokens that are still high-entropy. Also, the encryption is not limited to reversible and high-entropy encryption for storage but may cooperate with low-entropy and non-deterministic encryption for transfer. In contrast, existing tokenization systems lack the combination of reversibility and high-entropy provided by the envisioned systems and methods. These improvements are enabled, at least in part, by the specific architecture disclosed herein.

FIG. 1 depicts a system 100 for long-term storage tokenization including application databases in communication with data stores in a cloud-based environment, consistent with disclosed embodiments. A plurality of storage tokenizers, e.g., storage tokenizers 101a and 101b, can be computing devices forming part of a server rack or other collection of servers providing cloud-based services to application databases 103*a* and 103*b*. Accordingly, storage tokenizer 101*a* and application database 103*a* may form a first data center, storage tokenizer 101*b* and application database 103*b* may form a second data center, and the like. A plurality of local storages, e.g., application databases 103*a* and 103*b*, can be computing devices subscribing to or otherwise using cloud-based services provided by storage tokenizers 101*a* and 101*b*. Application databases 103*a* and 103*b* can also be computing devices configured to respond to requests from input device 105 and requesting device 107. Input device 105 and requesting device 107 may comprise computing devices used by customers and processors or any other parties exchanging information needing encryption and storage. Input device 105 and requesting device 107 may connect to application databases 103*a* and 103*b* across one or more networks, and application databases 103*a* and 103*b* may also connect to storage tokenizers 101*a* and 101*b* across one or more networks. The network(s) can be any type of network (including infrastructure) that provides communications, exchanges information, and/or facilitates the exchange of information, such as the Internet, a local area network (LAN), or other suitable connection(s). In addition, application databases 103*a* and 103*b* may synchronize across one or more networks, and storage tokenizers 101*a* and 101*b* may also synchronize across one or more networks.

Input device 105 can be configured to send a request to an application using application databases 103*a*. In some embodiments, the request may comprise an identification (labelled "id" in the example of FIG. 1 and comprising, e.g., a name, a reservation number, or the like) along with sensitive information (labeled 109 in the example of FIG. 1 and comprising, e.g., a credit card number, a passport number, or the like). In response, the application can be configured to process the request and provide the sensitive information 109 for storage by storage tokenizer 101*a* in. Storage tokenization 101*a* can then return a storage token 113 to the application, which may store the storage token 113 in association with the received id. Application database 103*a* can in turn return confirmation 115 to input device 105.

Storage tokenizer 101*a* may tokenize the request using a high-entropy algorithm. For example, storage tokenizer 101*a* may use a keyed hash function to transform the request into a token. Moreover, storage tokenizer 101*a* may generate an entry in an encrypted database linking the token to the request. For example, the encrypted database may comprise a key value store, such as a NoSQL database or the like. As further depicted in FIG. 1, storage tokenizers 101*a* and 101*b* may synchronize and/or application databases 103*a* and 103*b* may synchronize. For example, storage tokenizer 101*a* may transfer the generated token and corresponding database entry to storage tokenizer 101*b* for storage. Additionally or alternatively, application database 103*a* may send the request to application database 103*b* for processing and storage with storage tokenizer 101*b*.

Requesting device 107 can be configured to send a request to an application using application database 103*b*. For example, the request may comprise an identification (labeled "id" in the example of FIG. 1 and comprising, e.g., a name, a reservation number, or the like). Additionally or alternatively, the request may comprise sensitive information 109. In response, the application can be configured to process the request and provide an associated storage token 123 for retrieval to storage tokenizer 101*b*. For example, storage token 123 may comprise a copy of storage token 113 duplicated into application database 103*b* in the second data center for use by devices connected to an application in the second data center rather than the application in the first data center. Storage tokenizer 101*b* can then return the requested information (e.g., sensitive information 109) to application database 103*b* for processing by the application. In turn, the application can return the requested information (e.g., sensitive information 109) to requesting device 107.

Figure 2A:
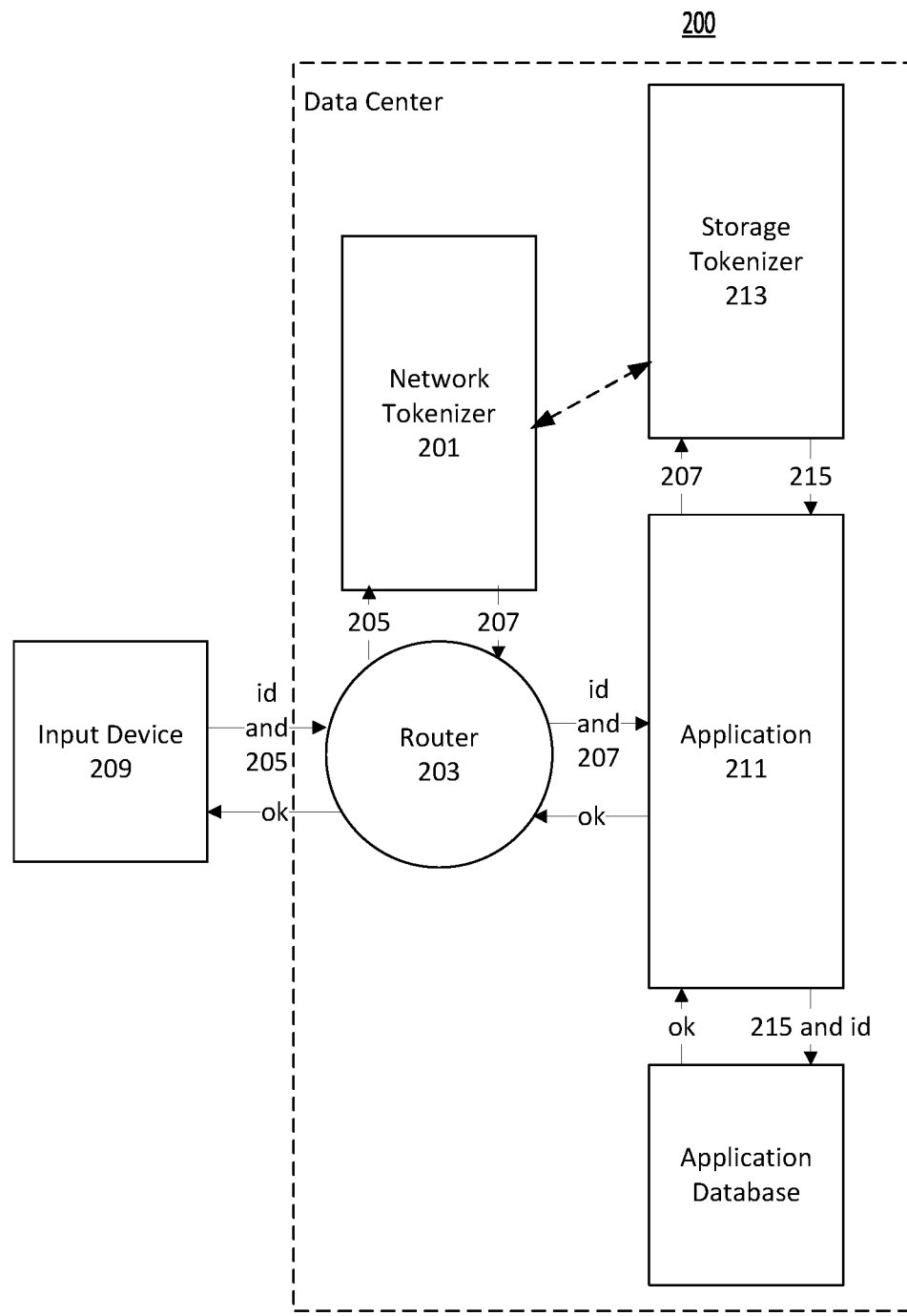
FIG. 2A depicts a system combining short-term token encryption with input to a data center employing long-term token encryption.

FIG. 2A depicts a system 200 that uses short-term network tokenization in combination with long-term storage tokenization, consistent with disclosed embodiments. Similar to storage tokenizers 101*a* and 101*b*, storage tokenizer 213 can be a computing device forming part of a server rack or other collection of servers providing cloud-based services to application 211. Similar to the applications using application databases 103*a* and 103*b*, application 211 can be a computing device subscribing to or otherwise using cloud-based services provided by storage tokenizer 213 and configured to respond to requests from input device 209. Similar to input device 105, input device 209 may comprise computing devices used by customers or any other parties supplying sensitive information (e.g., a credit card number, a passport number, or the like) needing storage and later retrieval. Input device 209 may connect to application 211 across one or more networks using router 203, and application 211 may also connect to storage tokenizer 213 across one or more networks. The network(s) can be any type of network (including infrastructure) that provides communications, exchanges information, and/or facilitates the exchange of information, such as the Internet, a local area network (LAN), or other suitable connection(s).

Input device 209 can be configured to send a request to application 211 via router 203. Similar to the example of FIG. 1, the request may comprise an identification (labeled "id" in the example of FIG. 2 and comprising, e.g., a name, a reservation number, or the like). Additionally or alternatively, the request may comprise sensitive information 205. En route, router 203 may use network tokenizer 201 to generate a network token 207 to use in place of sensitive information 205. For example, network token 207 may be generated using asymmetrical encryption and may, for example, be reversible. Any reversible tokenization technique, such as format-preserving techniques, may be used. In some embodiments, network tokenizer 201 may use a salt to further increase the entropy of network token 207. For example, network tokenizer 201 may add the salt to sensitive information 205 before generating network token 207. Network token 207 may also have an expiry (e.g., a few seconds, a few minutes, a few hours, a few days, or the like). In some embodiments, the expiry may be known only to application 211.

Although depicted as implemented by router 203, any other component of or in communication with system 200 may implement network tokenizer 201. For example, network tokenizer 201 may comprise a server or other computing device forming part of or at least in communication with system 200. Additionally or alternatively, router 203 may implement network tokenizer 201 by communicating with a server comprising network tokenizer 201 rather than executing instructions to implement network tokenizer 201 directly.

In response, application 211 can be configured to process network token 207 and provide network token 207 for storage by storage tokenizer 213. Storage tokenizer 213 may have a private key from network tokenizer 201 in order to decrypt network token 207 before using a keyed hash function to transform the decrypted sensitive information 205 into a different (e.g., storage) token and generating an entry in an encrypted database linking the new storage token to the decrypted sensitive information. Storage tokenizer 213 can then return storage token 215 to application 211, which can in turn store token 215 (with the identification, in embodiments including the identification) in an application database. The application database may return confirmation to application 211, which may in turn return the confirmation to router 203 and/or input device 209.

Figure 2B:
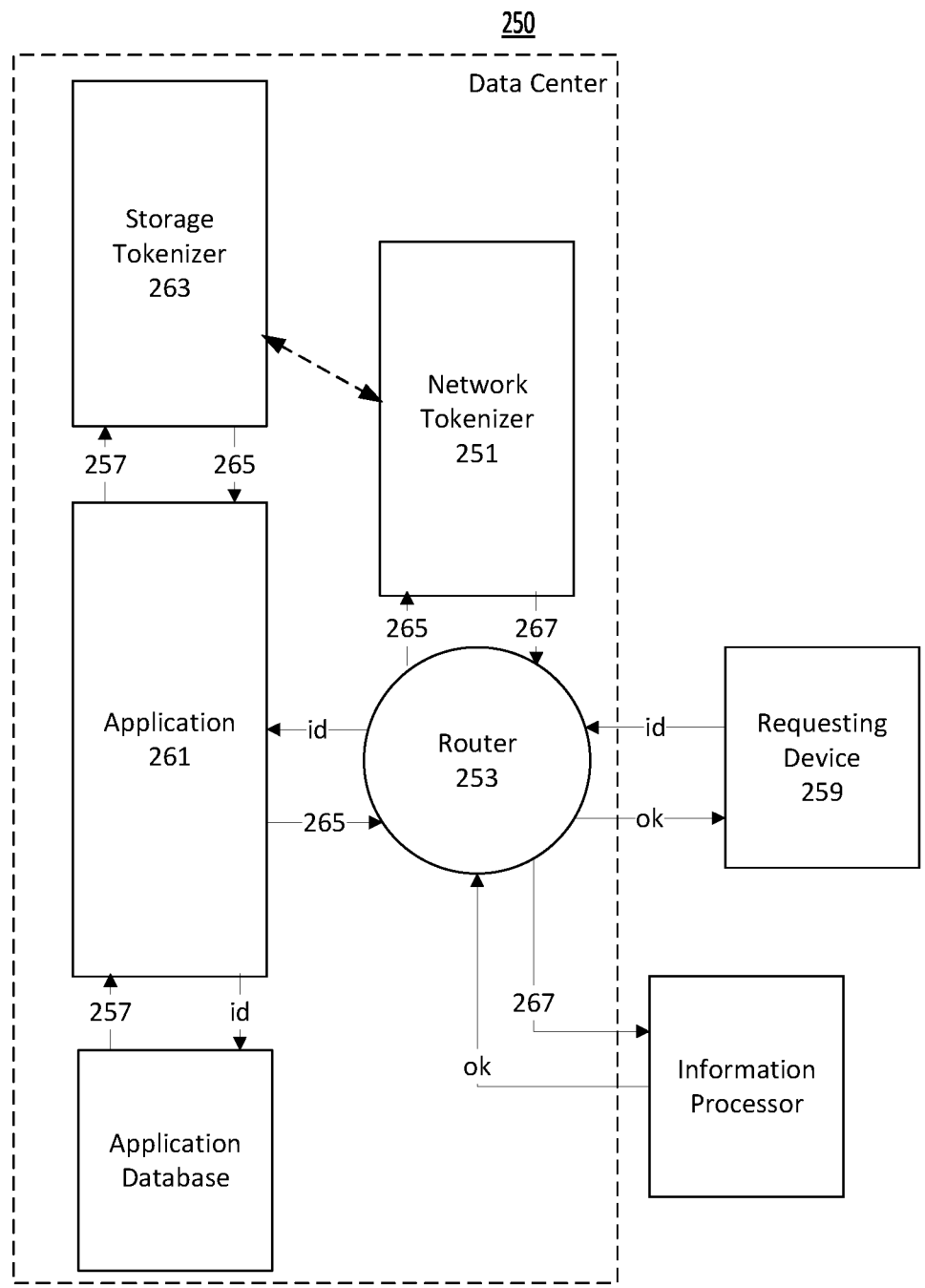
FIG. 2B depicts a system combining short-term token encryption with output from a data center employing long-term token encryption.

FIG. 2B depicts a system 250 that uses short-term network tokenization in combination with retrieval of long-term storage tokens, consistent with disclosed embodiments. Similar to storage tokenizers 101a and 101b, storage tokenizer 263 can be a computing device forming part of a server rack or other collection of servers providing cloud-based services to application 261. Similar to the applications using application databases 103a and 103b, application 261 can be a computing device subscribing to or otherwise using cloud-based services provided by storage tokenizer 263 and configured to respond to requests from requesting device 259. Similar to requesting device 107, requesting device 259 may comprise computing devices used by customers or any other parties requesting information needing encryption and storage. Requesting device 259 may connect to application 261 across one or more networks using router 253, and application 261 may also connect to storage tokenizer 263 across one or more networks. The network(s) can be any type of network (including infrastructure) that provides communications, exchanges information, and/or facilitates the exchange of information, such as the Internet, a local area network (LAN), or other suitable connection(s).

Requesting device 259 can be configured to send a request to application 261 via router 253. For example, the request may include an identification (e.g., labeled "id" in the examples of FIGS. 1 and 2A) associated with sensitive information 265 that has been tokenized and stored. Router 253 may pass the identification to application 261 for processing.

In response, application 261 can be configured to retrieve storage token 257 from a corresponding database using the identification. Moreover, application 261 may provide storage token 257 to storage tokenizer 263 for retrieval of corresponding sensitive information 265. For example, similar to sensitive information 109 of FIG. 1 and sensitive information 205 of FIG. 2A, sensitive information 265 of FIG. 2B may comprise a credit card number, a passport number, or the like. Storage tokenizer 263 can then return sensitive information 265 to application 261, which can in turn forward sensitive information 265 to requesting device 259 via router 253. Additionally or alternatively, as depicted in FIG. 2B, application 261 may forward sensitive information 265 to another device (e.g., an information processor such as Visa® or another credit card processor, U.S. Customs and Border Patrol (CBP) or another national security processor, a Fair Isaac Credit Organization (FICO) system or another credit score processor, or the like). Although not depicted in FIG. 2B, storage tokenizer 263 may generate a network token based on sensitive information 265 and return the network token to application 261 rather than returning sensitive information 265 directly.

Accordingly, as depicted in FIG. 2B, application 261 may use network tokenization to protect sensitive information 265 as sent to the information processor. En route, router 253 may use network tokenizer 251 to generate a network token 267 to use in place of sensitive information 265. Token 267 may be generated using asymmetrical encryption or any other reversible encryption. The reversible encryption may, for example, be format-preserving. In some embodiments, network tokenizer 251 may use a salt to further increase the entropy of network token 267. For example, network tokenizer 251 may salt sensitive information 265 before encrypting the salted information as network token 267. Token 267 may also have an expiry (e.g., a few seconds, a few minutes, a few hours, a few days, or the like). In some embodiments, the expiry may be known only to application 261.

Similarly to router 203, any other component of or in communication with system 250 may implement network tokenizer 251. For example, network tokenizer 251 may comprise a server or other computing device forming part of or at least in communication with system 250. Additionally or alternatively, router 253 may implement network tokenizer 251 by communicating with a server comprising network tokenizer 251 rather than executing instructions to implement network tokenizer 251 directly.

The information processor may then decrypt network token 267 (and, in some embodiments, de-salt the resulting information) in order to finish processing sensitive information 265 (e.g., by completing a transaction, performing a background or verification check, providing a credit score or other confidential information to a requesting party, or the like). In some embodiments, as depicted in FIG. 2B, information processor may provide confirmation to application 261 and/or requesting device 259.

Systems 200 and 250 may be combined in order to provide an embodiment of system 100 of FIG. 1 with end-to-end encryption. For example, all sensitive information included in requests or returning to devices and/or information processors on the networks may be encrypted using network tokenizers (e.g., tokenizers 201 and 251) while storage encryption still provides higher-entropy encryption that remains reversible and deterministic.

Figure 3:
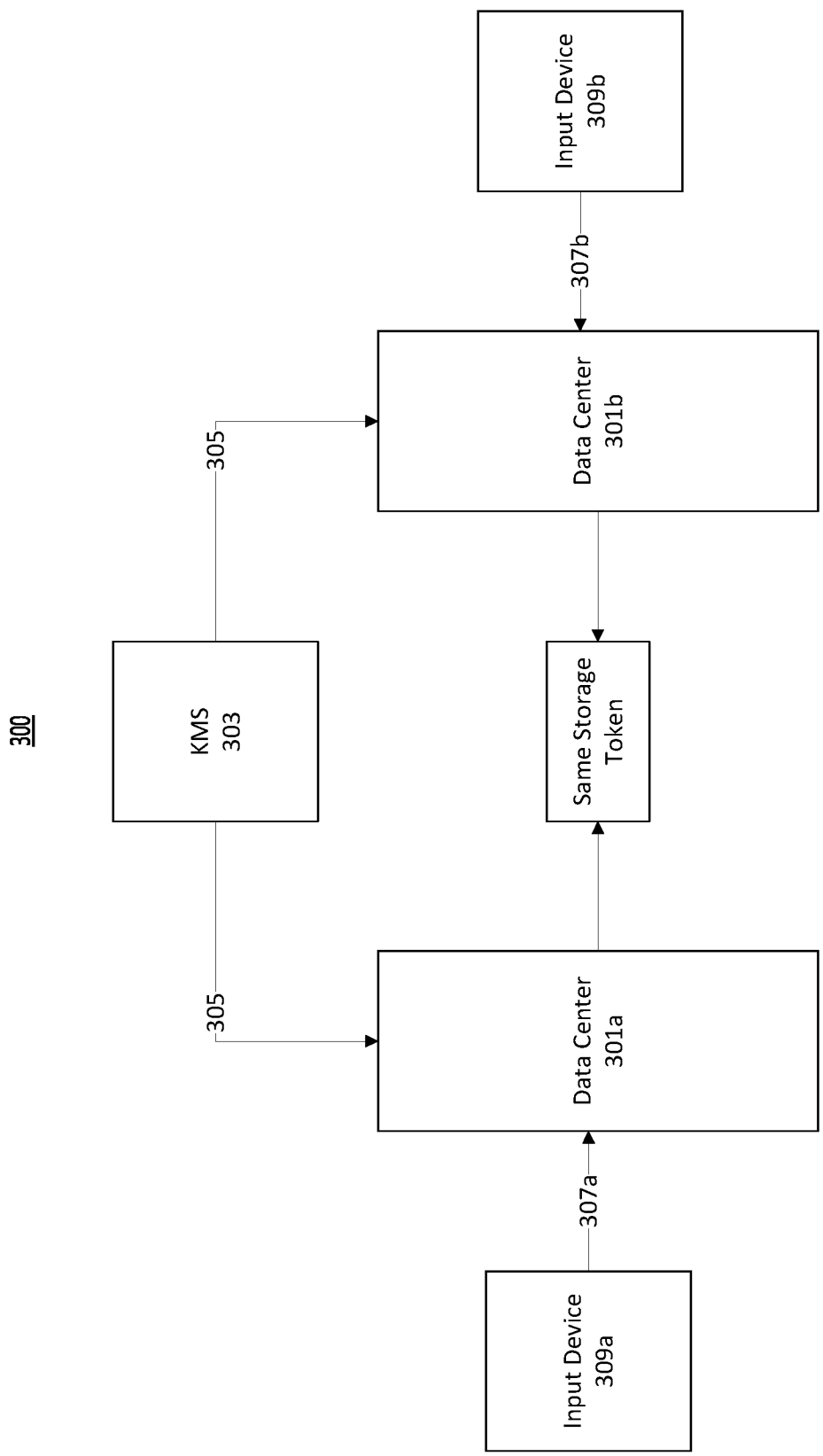
FIG. 3 depicts an exemplary schematic showing how the system of FIG. 1 does not result in conflicting tokens.

One technical advantage of this storage encryption is depicted in FIG. 3. In FIG. 3, two input devices (e.g., input devices 309a and 309b) may send requests (e.g., requests 307a and 307b) that are linked to the same individual, credit card, or other portion of sensitive information. However, requests 307a and 307b may be send to different data centers (e.g., data centers 301a and 301b, respectively) in a cloud environment.

If data centers 301a and 301b encrypt separately, then the corresponding records in their databases would be indexed to separate tokens. Accordingly, a key management system (KMS) 303 may distribute key 305 to data centers 301a and 301b, ensuring that the tokens generated based on the same individual, credit card, or other portion of sensitive information, are consistent with each other and do not result in conflicting records. Using deterministic encryption for storage purposes thus avoids problems with many high-entropy encryption systems, such as those relying on salting and other non-deterministic properties. Moreover, in combination with non-deterministic network tokenizing (e.g., as depicted in FIGS. 2A and 2B), the storage tokens may be kept even more secure by ensuring that only non-deterministic tokens may be intercepted on the networks.

Figure 4:
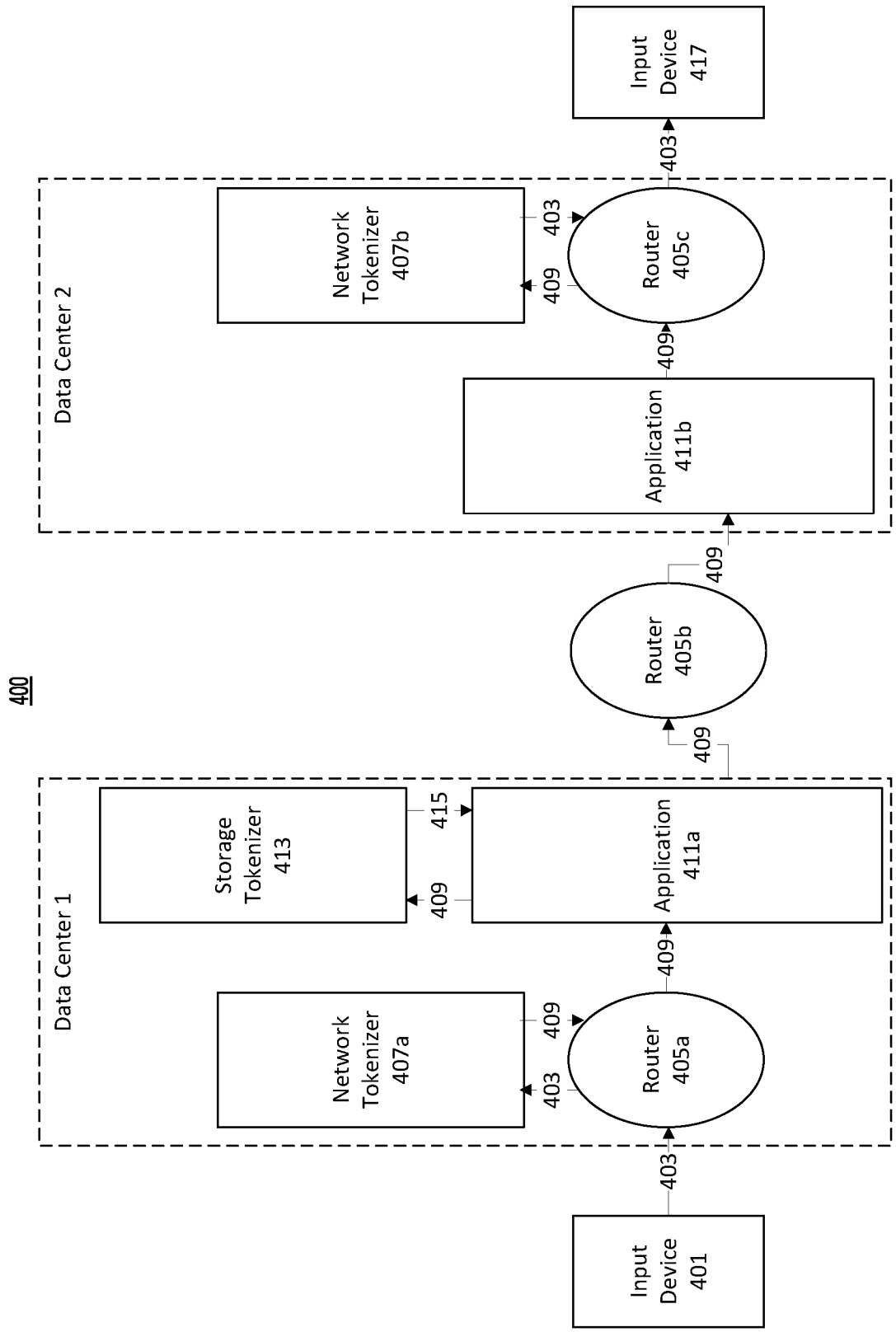
FIG. 4 depicts an exemplary schematic showing how the system of FIG. 2A may pass network tokens across a plurality of routers.

FIG. 4 depicts a system 400 configured to distribute one of the network tokens of FIG. 2A across a plurality of components. Similar to FIG. 2A, input device 401 can be configured to send a request including sensitive information 403 to application 411a via router 405a. En route, router 405a may use network tokenizer 407a to generate a network token 409 to use in place of sensitive information 403. Network token 409 may be generated using asymmetrical encryption or any other reversible tokenization technique. The reversible tokenization technique may, for example, be format-preserving. In some embodiments, network tokenizer 407a may use a salt to further increase the entropy of network token 409. For example, network tokenizer 407*a* may add the salt to sensitive information 403 before tokenizing. Network token 409 may also have an expiry (e.g., a few seconds, a few minutes, a few hours, a few days, or the like). In some embodiments, the expiry may be known only to applications 411*a* and 411*b*.

In response, application 411*a* can be configured to process network token 409 and provide network token 409 for storage by storage tokenizer 413. Storage tokenizer 413 may have a private key from network tokenizer 407*a* in order to decrypt network token 409 before using a keyed hash function to transform the decrypted sensitive information into a different (e.g., storage) token and generating an entry in an encrypted database linking the new storage token to the decrypted sensitive information. Storage tokenizer 413 can then return storage token 415 to application 411*a*, e.g., for processing and/or storage.

In addition, application 411*a* may also forward network token 409 for further processing by application 411*b*. For example, as depicted in FIG. 4, network token 409 may be sent through router 405*b* to application 411*b*. Because network token 409 is already encrypted, router 405*b* need not further encrypt network token 409.

In response, application 411*b* may process network token 409. Accordingly, application 411*b* may also have a private key from network tokenizer 407*a* in order to decrypt network token 409 and process sensitive information 403 as required. Additionally or alternatively, application 411*b* may forward network token 409 for further processor by another input device 417. For example, as depicted in FIG. 4, network token 409 may be sent through router 405*c* to input device 417. Because input device 417 needs sensitive information 403 and network token 409 is encrypted, router 405*c* may use network tokenizer 407*b* to decrypt network token 409. For example, network tokenizer 407*b* may synchronize keys (and, in some embodiments, salts) with network tokenizer 407*a* in order to decrypt network token 409. System 400 as depicted in FIG. 4 thus allows for secure storage and transfer of requests across a network concurrently.

Figure 5:
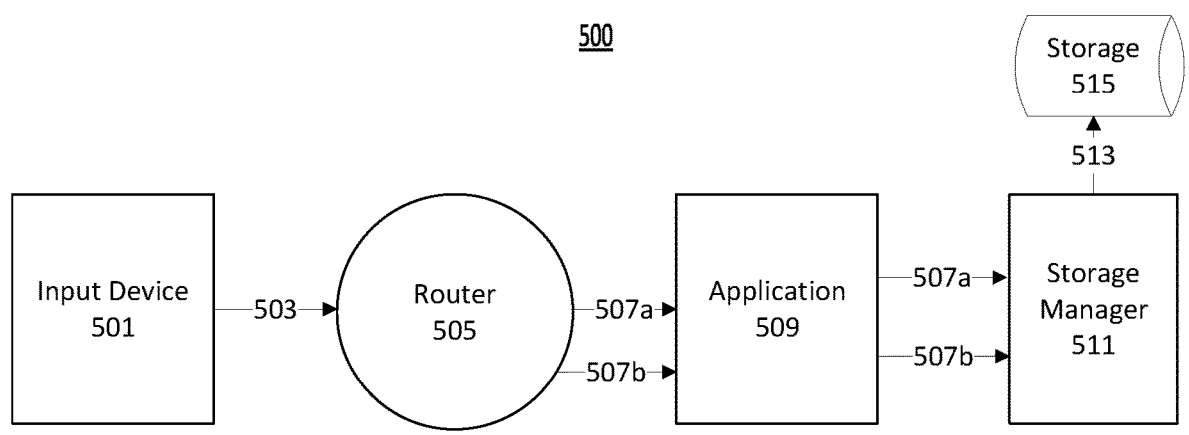
FIG. 5 depicts a graphical example of how storage tokens are consistent across key renewals for network tokenization.

FIG. 5 depicts a graphical example of how storage tokens are consistent across key renewals for network tokenization, consistent with disclosed embodiments. As shown in FIG. 5, and similar to FIG. 1, input device 501 may provide sensitive information 503 (e.g., included in a request) via a router 505. Although not depicted in FIG. 5, router 505 may use a network tokenizer on sensitive information 503 to generate a network token 507*a*. Application 509 may process network token 507*a* (e.g., by using a key from the network tokenizer to decrypt network token 507*a* and process sensitive information 503 as required) and provide the same to storage manager 511 for secure storage on database 515. For example, storage manager 511 and database 515 may together comprise a storage tokenizer (e.g., similar to storage tokenizer 101*a* or 101*b* of FIG. 1). Accordingly, storage manager 511 may decrypt network token 507*a* before applying a keyed hash function to the decrypted information (comprising sensitive information 503) to generate storage token 513 for storage. In some embodiments, the network tokenizer may also salt sensitive information 503 before tokenization. In such embodiments, storage manager 511 may de-salt the decrypted information before generating storage token 513.

The same storage token 513 will be generated for the same sensitive information (in this example, sensitive information 503) even when the network tokenizer used by router 505 renews its encryption key. For example, sensitive information 503 may now be transformed to network token 507*b* using the new key rather than network token 507*a*. Storage manager 511, however, may also renew its key (and, in some embodiments, its salt) when the network tokenizer used by router 505 renews its key in order to decrypt (and, in some embodiments, de-salt) network token 507*b* and generate the same storage token 513 based on the same decrypted information (comprising sensitive information 503). Accordingly, example 500 depicts how conflict resolution may be preserved even when non-deterministic network tokenizing (e.g., as depicted in FIGS. 2A and 2B) is incorporated into the storage tokenization described in the present disclosure.

Figure 6:
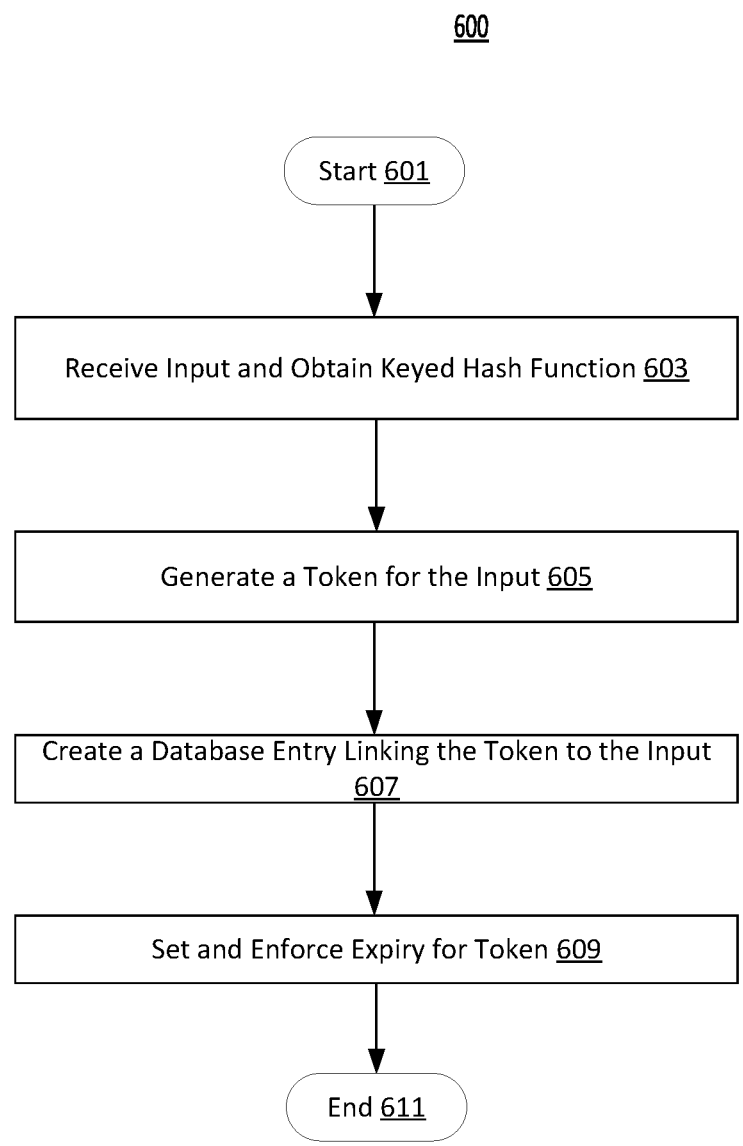
FIG. 6 depicts a flowchart illustrating an exemplary method 600 for performing long-term encryption for storage.

FIG. 6 depicts a flowchart illustrating an exemplary method 600 for tokenizing storage information in a cloud environment, consistent with disclosed embodiments. In some embodiments, method 600 can include steps of receiving input and a keyed hash function, generating a token for the input, creating a database entry linking the token to the input, and setting and enforcing an expiry for the token. As would be recognized by one of skill in the art, this particular sequence of steps is not intended to be limiting. The steps of method 600 can be combined or divided, and method 600 can include additional steps or fewer steps, without departing from the envisioned embodiments. Method 600 may be executed by at least one processor (e.g., processor(s) 801*a* and/or 801*b* of device 800 of FIG. 8). For example, the at least one processor may execute instructions stored on at least one non-transitory memory, and the at least one processor and the at least one non-transitory memory may be distributed in a cloud environment.

After starting in step 601, the system can be configured to receive input to be tokenized in step 603. For example, as discussed above, the input may comprise sensitive information, such as a passport number, a credit card, a social security number, or any other sensitive information, for storage and later retrieval. In some embodiments, the input may be included in a larger request, such as a request for a reservation, for a background check or verification, or the like. Additionally or alternatively, the input may comprise a network token generated by a network tokenizer in communication with the system. For example, as described above with respect to FIG. 2A, the network tokenizer may encrypt the sensitive information before transmission to the system. In such embodiments, the network tokenizer may generate the network token using reversible tokenization, such as format preserving encryption or any other reversible tokenization technique. Such reversible tokenization may be asymmetric such that the public key used by the router to encrypt is distinct from a private key used to decrypt. In other embodiments, the reversible tokenization may be symmetric.

In embodiments where the input comprises the network token, the system may further be configured to obtain a key corresponding to a key used by the network tokenizer to generate the network token and, using the corresponding key, decode the network token before generating a token using the keyed hash function in step 605. Accordingly, in asymmetric embodiments, the key used by the network tokenizer may comprise the public key and the corresponding key may comprise the private key. In symmetric embodiments, the key used by the network tokenizer may comprise the corresponding key. In either embodiment, the system can also be configured to periodically renew the corresponding key, e.g., by authenticating itself to a key management system (KMS). The system may authenticate itself using a passcode or other credentials, using a digital certificate, or the like.

In embodiments where the input comprises the network token, the network tokenizer may salt the sensitive information prior to generating the token. For example, the salt may comprise one or more random characters added to the sensitive information before tokenization or added to the token to finalize the token. Accordingly, the system can also be configured to obtain the salt used by the network tokenizer and remove the salt from the decoded network token before generating a storage token using the keyed hash function in step 605. For example, the system may remove the salt from the network token in order to ensure that the corresponding key properly decodes the network token and/or may remove the salt from the decoded network token in order to ensure that the decoded information properly corresponds to the sensitive information.

In embodiments including a network tokenizer, the system can also be configured to authenticate the network tokenizer before accepting the input. The network tokenizer may authenticate itself using a passcode or other credentials, using a digital certificate, or the like.

In some embodiments, the system can also be configured to obtain a keyed hash function from a key management system in step 603. For example, the system may authenticate itself to the key management system in step 603. The system may authenticate itself using a passcode or other credentials, using a digital certificate, or the like. In embodiments where the system also obtains a key corresponding to a key used by the network tokenizer to generate the network token, the key management system distributing the keyed hash function may comprise the same key management system distributing the corresponding key or a different key management system. Additionally or alternatively, the keyed hash function may be retrieved from a storage, e.g., local to the system or located on a remote server. In embodiments where the keyed hash function is retrieved from a remote storage, the system may authenticate itself using a passcode or other credentials, using a digital certificate, or the like.

After step 603, the system can be configured to use the keyed hash function to generate a storage token for the input in step 605. For example, the system may run the input (or, in embodiments where the input comprises a network token, the decoded input token) directly through the keyed hash function. In other embodiments, as explained above, the system may extract the sensitive information comprising the input (e.g., a name, a credit card, an identification number, or the like) from an overall request that includes the input and run the extracted portion through the keyed hash function.

After step 605, the system can be configured to create an encrypted database entry linking the storage token to the received input in step 607. For example, the database may be indexed by storage tokens generated from the keyed hash function and provide the sensitive information in response to an authorized request including the storage token. In some embodiments, the database may comprise a key value store, such as a NoSQL database, such as an ArangoDB database, an Oracle® NoSQL database, or the like. The database itself may be encrypted (e.g., using a key) and/or entries within the database may be encrypted (e.g., using one or more keys).

In some embodiments, the system can also be configured to synchronize the encrypted database entry across one or more servers. Accordingly, the database may comprise a distributed database. In such embodiments, the system can also be configured to authenticate the one or more servers before duplication. The system may authenticate the one or more servers using a passcode or other credentials, using a digital certificate, or the like.

Duplication of the encrypted database may allow for disaster recovery of the system. For example, when the database fails, the system may be further configured to retrieve entries of the encrypted database from one or more servers and rebuild the encrypted database using the retrieved entries. In such embodiments, the system can also be configured to authenticate the one or more servers before retrieving entries, as explained above.

After step 607, the system can be configured to set an expiry for the storage token in step 609. For example, if the input comprises at least a portion of a reservation, the expiry may be set based on a date of the reservation (e.g., the day of, the day after, or the like). In another non-limiting example, if the input comprises at least a portion of a transaction, the expiry may be set based on an estimate time for the transaction to clear (e.g., 3 business days, 5 business days, or the like). In some embodiments, the system can also be configured to provide the linked input in response when the storage token is received before the expiry in step 609. Accordingly, the system may enforce the expiry by closing access to the sensitive information after the token expires.

In any of the embodiments above, the input may be received from a first application, and the storage token may be received before the expiry from a second application. For example, the input may comprise a network token generated by a network tokenizer in communication with the system, and an expiry of the network token may be known only to the first application. Alternatively, the input may comprise a network token generated by a network tokenizer in communication with the system, and an expiry of the network token may be known to the first application and the second application.

Method 600, which ends in step 611, may further include additional steps not shown in FIG. 6. For example, method 600 may use network tokenizers to handle any outages by the system. For example, when the database is malfunctioning, the system may be configured to distribute the keyed hash function to a network tokenizer in communication with the system and, when the database is functioning, receive the storage token from the network tokenizer generated using the keyed hash function. A malfunction may include any index error, overflow error, or other error such that entries are not retrievable from the database. In such embodiments, the system can also be configured to authenticate the network tokenizer before distributing the keyed hash function. The network tokenizer may authenticate itself to the system using a passcode or other credentials, using a digital certificate, or the like.

Additionally or alternatively, method 600 may use caches to handle outages by the system. For example, the input may comprise a network token generated by a network tokenizer in communication with the system, and the system may be further configured to, when the database is malfunctioning, store the input in a cache. Then, when the database is functioning, the system may be further configured to decode the network token and proceed with generating a storage token using the keyed hash function. In such embodiments, the cache may comprise an encrypted storage. For example, the cache may include a data lake or other unstructured storage that is protected by a password or other credentials, a certificate, or the like.

In some embodiments, the system may receive an identification with the sensitive information. In such embodiments, the system may also store the identification with the storage token. For example, the system may store the identification and the storage token in an application database (e.g., application database 103a or 103b). Accordingly, if the identification is provided to the system (e.g., before expiry of the storage token), the system may retrieve the storage token from the application database. This may allow the system to perform any other processing on storage token and/or to obtain the sensitive information corresponding to the storage token.

Method 600 may provide for a conflict-free tokenization of sensitive information, e.g., as depicted in FIG. 3. According, in a non-limiting example, a different processor of the cloud environment including the system may receive a second input to be tokenized, obtaining the keyed hash function from the key management system, and use the keyed hash function to generate a second storage token for the input. As long as the input is the same, the second storage token generated by the different processor will be the same as the storage token generated by the system, preventing conflicts across data centers of the cloud environment.

Figure 7:
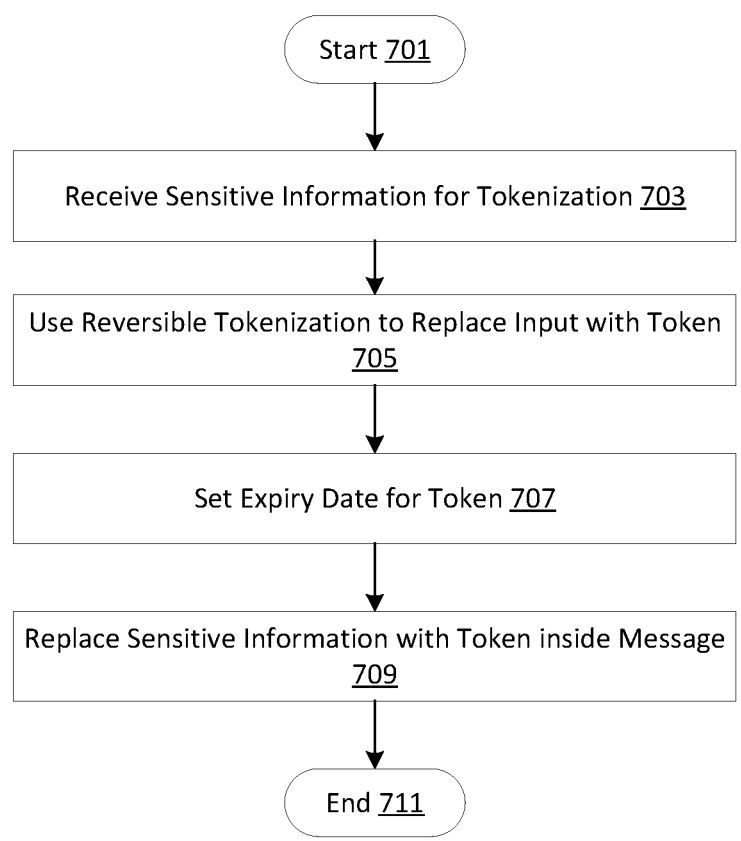
FIG. 7 depicts a flowchart illustrating an exemplary method 700 for performing short-term encryption for use in a network.

FIG. 7 depicts a flowchart illustrating a method 700 of employing network tokenization in a cloud environment, consistent with disclosed embodiments. In some embodiments, method 600 can include steps of receiving input for storage, using format-preserving encryption to replace the input with a token, setting an expiry for the token, and passing the token to an application for storage. As would be recognized by one of skill in the art, this particular sequence of steps is not intended to be limiting. The steps of method 700 can be combined or divided, and method 700 can include additional steps or fewer steps, without departing from the envisioned embodiments. Method 700 may be executed by at least one processor (e.g., processor(s) 801a and/or 801b of device 800 of FIG. 8) and ends in step 711.

After starting in step 701, the system can be configured to receive sensitive information to be stored in step 703. For example, as discussed above, the sensitive information may comprise a passport number, a credit card, a social security number, or any other sensitive information for storage and later retrieval. In some embodiments, the sensitive information may be included in a larger request, such as a request for a reservation, for a background check or verification, or the like. One or more applications may be intended recipients of the input for processing and storage. Accordingly, the system may comprise a network hub or other intermediary configured to tokenize the input before processing and storage.

In some embodiments, the system can also be configured to renew a key for asymmetric encryption in step 703. Alternatively, the system can be configured to renew a key for symmetric encryption in step 703. In either embodiment, the system may renew the key by authenticating itself to a key management system (KMS). The system may authenticate itself using a passcode or other credentials, using a digital certificate, or the like.

After step 703, the system can be configured to use reversible tokenization to replace the input with a token in step 705. For example, the system may use the key (whether a public key in an asymmetric key pair or a symmetric key) to encrypt the sensitive information as a token. In some embodiments, the system may receive the sensitive information directly as the input. In other embodiments, the system may extract the sensitive information from an overall request comprising the input and run the extracted portion through the key.

After step 705, the system can be configured to set an expiry for the token in step 707. In some embodiments, the expiry may be limited to particular components of the system. For example, the expiry may be known only to one or more applications configured to process the token. Additionally or alternatively, the expiry may be known to one or more data centers configure to decode the token and re-encrypt the input for long-term storage.

After step 707, the system can be configured to replace the sensitive information with the token inside a message, e.g., addressed to an application for storage, in step 709. For example, the message may comprise an overall request comprising the input (as described above) with the sensitive information replaced with the token. Additionally or alternatively, the message may comprise an envelope for the token. In any such embodiments, the system may transmit the token across one or more networks, e.g., by transmitting the message across the one or more networks. The network(s) can be any type of network (including infrastructure) that provides communications, exchanges information, and/or facilitates the exchange of information, such as the Internet, a local area network (LAN), or other suitable connection(s).

In some embodiments, methods 600 and 700 can be running on the same computing devices. For example, methods 600 and 700 can both be provided by one or more servers of a cloud environment (e.g., storage tokenizers 101a and 101b). In other embodiments, method 600 can be provided by one or more servers of a cloud environment (e.g., storage tokenizers 101a and 101b) while method 700 can be provided by one or more other servers of the cloud environment (e.g., network tokenizers 201 and 251) and/or by network hubs (e.g., router 505) in communication with the cloud environment and/or with applications accessing the cloud environment.

The preceding disclosure describes embodiments of a system for storage tokenization of sensitive information. Such a system can generally be used with applications connected to a cloud-based environment as described in FIG. 1. For example, an application can be configured to process reservations from a customer using an input device. In this non-limiting example, the application may store the request from the customer for later retrieval when the customer checks in. In another example, an application can be configured to process purchases from a customer using an input device. In this non-limiting example, the application may store a credit card from the customer in addition to forward a token of the credit card to a transaction processor.

FIG. 8 is a block diagram of an example device with which the systems, methods, and apparatuses of the present invention may be implemented. For example, device 800 may comprise any of the storage tokenizers described herein (e.g., storage tokenizers 101a and 101b of FIG. 1 or the like) and/or any of the network tokenizers described herein (e.g., network tokenizer 201 of FIG. 2A, network tokenizer 251 of FIG. 2B, or the like).

Example device 800 may include at least one processor (e.g., processor 801a and/or processor 801b) and at least one memory (e.g., memories 805a and 805b). Processor(s) 801a and/or 801b may comprise a central processing unit (CPU), a graphics processing unit (GPU), or other similar circuitry capable of performing one or more operations on a data stream. Processor(s) 801a and/or 801b may be configured to execute instructions that may, for example, be stored on one or more of memories 805a and 805b. Memories 805a and 805b may be volatile memory (such as RAM or the like) and/or non-volatile memory (such as flash memory, a hard disk drive, or the like). As explained above, memories 805a and 805b may store instructions for execution by processor(s) 801a and/or 801b. As further depicted in FIG. 8, device 800 may include at least one network interface controller (NIC) (e.g., NIC 807). NIC 807 may be configured to facilitate communication over at least one computing network (e.g., network 809). Communication functions may thus be facilitated through one or more NICs, which may be wireless and/or wired and may include an Ethernet port, radio frequency receivers and transmitters, and/or optical (e.g., infrared) receivers and transmitters. The specific design and implementation of the one or more NICs depend on the computing network 807 over which device 800 is intended to operate. For example, in some embodiments, device 800 may include one or more wireless and/or wired NICs designed to operate over a GSM network, a GPRS network, an EDGE network, a Wi-Fi or WiMax network, and a Bluetooth® network. Alternatively or concurrently, device 800 may include one or more wireless and/or wired NICs designed to operate over a TCP/IP network. As depicted in FIG. 8, device 800 may include and/or be operably connected to a storage device 803. Storage device 803 may be volatile (such as RAM or the like) or non-volatile (such as flash memory, a hard disk drive, or the like). An I/O module may enable communications between processor(s) 801a and/or 801b, memories 805a and 805b, NIC 807, and/or storage device 803. Processor(s) 801a and/or 801b, memories 805a and 805b, NIC 807, and/or storage device 803 may comprise separate components or may be integrated in one or more integrated circuits. The various components in device 800 may be coupled by one or more communication buses or signal lines (not shown).

In some examples, a system for tokenizing information in a cloud environment may comprise at least one processor and at least one non-transitory memory containing instructions that, when executed by the at least one processor, cause the system to perform operations. The operations may comprise receiving input to be tokenized, obtaining a keyed hash function, using the keyed hash function at a storage tokenizer, generating a storage token for the input, creating an encrypted database entry linking the generated token to the received input, setting an expiry for the storage token, and when the storage token is received before the expiry, providing the linked input in response.

In some examples, the keyed hash function may be obtained from a key management system. Additionally or alternatively, the input may comprise a network token generated by a network tokenizer. In some examples, the at least one processor and the at least one non-transitory memory may be distributed in a cloud environment. In some examples, the system may further comprise a server functioning as a network tokenizer, and the input may comprise a network token generated by the server from sensitive information.

In some examples, the system may further comprise a network tokenizer, and the input may comprise a network token generated by the network tokenizer from sensitive information. In some examples, the operations may further comprise: receiving an identification; and storing the identification along with the storage token in an application database. In such examples, the operations may further comprise: receiving an identification; and obtaining the storage token stored in the application database.

In some examples, the system may further comprise a network tokenizer in communication with the at least one processor and configured to generate a network token from sensitive information, wherein the input may comprise said network token, and the operations may further comprise: receiving the storage token, obtaining the network token from the storage tokenizer, routing the network token to the network tokenizer, and obtaining the sensitive information from the network token. In any examples including a network tokenizer, the network tokenizer may generate the network token using reversible tokenization. For example, the reversible tokenization may comprise format-preserving encryption.

In any examples including a network tokenizer, the operations may further comprise: obtaining a key corresponding to a key used by the network tokenizer to generate the network token; using the corresponding key, decoding the network token; and then generating a storage token using the keyed hash function. In such examples, the operations may further comprise periodically renewing the corresponding key. In any examples including a network tokenizer, the network tokenizer may salt the sensitive information prior to generating the network token, and the operations may her comprise: obtaining the salt used by the network tokenizer; and removing the salt from the decoded network token before generating the storage token using the keyed hash function.

In some examples, the operations may further comprise synchronizing the encrypted database entry across one or more servers. In such examples, the operations may further comprise authenticating the one or more servers before synchronization. In some examples, the database may comprise a key-value store. For example, the key value store may comprise a NoSQL database. In some examples, the operations may further comprise, when the database fails: retrieving entries of the encrypted database from one or more other servers; and rebuilding the encrypted database using the retrieved entries. In such examples, the operations may further comprise authenticating the one or more other servers before retrieving entries.

In some examples, the operations may further comprise: receiving, at a different processor of the cloud environment, a second input to be tokenized, obtaining, for the different processor, the keyed hash function from the key management system, and using the keyed hash function, generating, at the different processor, a second storage token for the input, wherein the second storage token generated by the different processor is the same as the storage token generated by the at least one processor.

In some examples, the operations may further comprise: when the encrypted database is malfunctioning, distribute the keyed hash function to a network tokenizer and generate a token using the keyed hash function at the network tokenizer; and when the encrypted database is functioning, receive as the storage token, the token generated using the keyed hash function from the network tokenizer. In such examples, the operations may further comprise authenticating the network tokenizer before distributing the keyed hash function.

In some examples, the input may comprise a token generated by a network tokenizer, and the operations may further comprise: when the encrypted database is malfunctioning, storing the input in a cache; and when the encrypted database is functioning, decoding the network token and storing an entry linking the storage token to the decoded input. In such examples, the cache may comprise an encrypted storage. In any of the examples discussed above, the system may be in communication with at least one network router. In such examples, the at least one network router may execute instructions to function as the network tokenizer. Additionally, the operations may further comprise authenticating the network router before accepting the input.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion. Moreover, while illustrative embodiments have been described herein, the scope includes any and all embodiments having equivalent elements, modifications, omissions, combinations (e.g., of aspects across various embodiments), adaptations and/or alterations based on the present disclosure.

Instructions or operational steps stored by a computer-readable medium may be in the form of computer programs, program modules, or codes. As described herein, computer programs, pro-gram modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system for tokenizing information in a cloud environment, wherein the system is in communication with a network tokenizer and comprises:
    at least one processor; and
    at least one non-transitory memory containing instructions that, when executed by the at least one processor, cause the system to perform operations comprising:
        receiving input to be tokenized;
        obtaining a keyed hash function;
        using the keyed hash function at a storage tokenizer, generating a first token for the input;
        creating an encrypted database entry linking the generated first token to the received input, wherein the encrypted database entry is stored in an encrypted database;
        setting an expiry for the first token;
        determining that the encrypted database is malfunctioning;
        in response to determining the encrypted database is malfunctioning,
        authenticating the network tokenizer,
        distributing the keyed hash function to the network tokenizer, and
        generating a second token using the keyed hash function at the network tokenizer;
        receiving the second token at the system before the expiry; and
        providing the linked input in response to receiving the second token.

2. The system of claim 1, wherein the keyed hash function is obtained from a key management system.

3. The system of claim 2, wherein the operations further comprise:
    receiving, at a different processor of the cloud environment, a second input to be tokenized;
    obtaining, for the different processor, the keyed hash function from the key management system; and
    using the keyed hash function, generating, at the different processor, a third storage token for the input,
    wherein the third storage token generated by the different processor is the same as the first token generated by the at least one processor.

4. The system of claim 1, wherein the operations further comprise:
    receiving an identification; and
    storing the identification along with the first token in an application database.

5. The system of claim 1, wherein the operations further comprise:
    synchronizing the encrypted database entry across one or more servers.

6. The system of claim 5, wherein the operations further comprise:
    authenticating the one or more servers before synchronization.

7. The system claim 1 wherein the encrypted database entry is stored in an encrypted database, and the operations further comprise, when the encrypted database fails:
    retrieving entries of the encrypted database from one or more other servers; and
    rebuilding the encrypted database using the retrieved entries.

8. The system of claim 7, wherein the operations further comprise:
    authenticating the one or more other servers before retrieving entries.

9. The system of any one of claim 1, wherein the system comprises the network tokenizer.

10. The system of claim 1, wherein the operations further comprise:
    determining that the encrypted database is functioning; and
    in response to determining the encrypted database is functioning, receive the second token generated using the keyed hash function from the network tokenizer.

11. The system of claim 1, wherein the input comprises a network token generated by the network tokenizer.

12. The system of claim 11, wherein the operations further comprise:
    when the encrypted database is malfunctioning, storing the input in a cache; and
    when the encrypted database is functioning, decoding the network token and storing an entry linking the first token to the decoded input.

13. The system of claim 11, wherein the network token is generated by the network tokenizer from sensitive information.

14. The system of claim 13, wherein the network tokenizer is in communication with the at least one processor, and wherein the operations further comprise:

receiving the first token;
obtaining the network token from the storage tokenizer;
routing the network token to the network tokenizer; and
obtaining the sensitive information from the network token.

15. The system of claim 13, wherein the network tokenizer salts the sensitive information with a salt prior to generating the network token, and wherein the operations further comprise:
obtaining the salt used by the network tokenizer; and
removing the salt from the decoded network token before generating the first token using the keyed hash function.

16. The system of claim 11, wherein the network tokenizer generates the network token using reversible tokenization.

17. The system claim 11, wherein the operations further comprise:
obtaining a key corresponding to a key used by the network tokenizer to generate the network token;
using the corresponding key, decoding the network token; and
generating the first token using the keyed hash function.

18. A method for tokenizing information in a cloud environment, the method comprising:
receiving, by a processor, input to be tokenized, wherein a device comprises the processor and is in communication with a network tokenizer;
obtaining, by the processor, a keyed hash function;
using, by the processor, the keyed hash function at a storage tokenizer of the processor to generate a first token for the input;
creating, by the processor, an encrypted database entry linking the generated first token to the received input, wherein the encrypted database entry is stored in an encrypted database;
setting, by the processor, an expiry for the storage first token;
determining, by the processor, that the encrypted database is malfunctioning;
in response to determining the encrypted database is malfunctioning,
authenticating, by the processor, the network tokenizer,
distributing, by the processor, the keyed hash function to the network tokenizer, and
generating, by the processor, a second token using the keyed hash function at the network tokenizer;
receiving, by the processor, the second token before the expiry; and
providing, by the processor, the linked input in response to receiving the second token.

19. A non-transitory computer-readable storage medium comprising computer-readable instructions that upon execution by a processor of a computing device cause the computing device to:
receive input to be tokenized, wherein the computing device is in communication with a network tokenizer;
obtain a keyed hash function;
use the keyed hash function at a storage tokenizer, generating a first token for the input;
create an encrypted database entry linking the generated first token to the received input, wherein the encrypted database entry is stored in an encrypted database;
sett an expiry for the first token;
determine that the encrypted database is malfunctioning;
in response to determine the encrypted database is malfunctioning,
authenticate the network tokenizer,
distribute the keyed hash function to the network tokenizer, and
generate a second token using the keyed hash function at the network tokenizer;
receive the second token before the expiry; and
provide the linked input in response to receiving the second token.

* * * * *